(12) United States Patent
Jun et al.

(10) Patent No.: US 10,316,879 B2
(45) Date of Patent: Jun. 11, 2019

(54) FRAME SYSTEM FOR SOLAR CELL MODULE

(75) Inventors: Jinhyung Jun, Seoul (KR); Jinhyung Ahn, Seoul (KR); Sungeun Lee, Seoul (KR); Jeonghun Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 13/401,320

(22) Filed: Feb. 21, 2012

(65) Prior Publication Data

US 2012/0145227 A1    Jun. 14, 2012

(30) Foreign Application Priority Data

Feb. 22, 2011  (KR) .......................... 10-2011-0015434

(51) Int. Cl.
| | | |
|---|---|---|
| *H01L 31/048* | (2014.01) | |
| *F16B 21/07* | (2006.01) | |
| *F16B 21/08* | (2006.01) | |
| *H02S 20/23* | (2014.01) | |
| *F24S 25/33* | (2018.01) | |

(Continued)

(52) U.S. Cl.
CPC .......... *F16B 21/073* (2013.01); *F16B 21/084* (2013.01); *F24S 25/33* (2018.05); *F24S 25/634* (2018.05); *H02S 20/23* (2014.12); *F16B 11/006* (2013.01); *F24S 20/66* (2018.05); *F24S 20/67* (2018.05); *F24S 2025/601* (2018.05); *Y02B 10/12* (2013.01); *Y02B 10/20* (2013.01); *Y02E 10/47* (2013.01)

(58) Field of Classification Search
CPC ............... H02S 20/10–32; H02S 20/23; H01L 31/048–0488; Y02E 10/47; F24J 2/5258; F24J 2/52; F16B 21/06; F16B 21/065; F16B 21/02–205; F16B 17/002; F16B 5/06

USPC .......... 136/243–265; 126/561–714; 52/173.3
See application file for complete search history.

(56) References Cited

U.S. PATENT DOCUMENTS 2,406,665 A * 8/1946 Churchill .................. F16B 5/06
                                                         24/294
3,466,966 A    9/1969 Brown
(Continued)

FOREIGN PATENT DOCUMENTS

| | | | |
|---|---|---|---|
| FR | 2801352 A1 | 5/2001 | |
| JP | 7-44657 Y2 | 10/1995 | |

(Continued)

*Primary Examiner* — Niki Bakhtiari
(74) *Attorney, Agent, or Firm* — Birch, Stewart, Kolasch & Birch, LLP (57) ABSTRACT

A frame system for a solar cell module, the frame system includes: a first frame member including a first body that is configured to be fixed to a substrate of the solar cell module and a male coupling portion that is protruded from the first body; and a second frame member including a second body that is configured to be fixed to an installation object and a female coupling portion that is configured to be coupled to the male coupling portion, wherein at an outer surface of the male coupling portion, a protrusion including an inclined surface having an upper width smaller than a lower width and a separation prevention surface that is positioned at a lower end portion of the inclined surface is formed, and at an inside of the female coupling portion, a protrusion coupling portion that corresponds to the protrusion is formed.

14 Claims, 7 Drawing Sheets

(51) Int. Cl.
*F24S 25/634* (2018.01)
*F16B 11/00* (2006.01)
*F24S 20/67* (2018.01)
*F24S 25/60* (2018.01)
*F24S 20/66* (2018.01)

(56) References Cited

U.S. PATENT DOCUMENTS

| | | | |
|---|---|---|---|
| 4,259,767 A * | 4/1981 | Holton | F16B 2/245 |
| | | | 29/281.4 |
| 4,819,309 A * | 4/1989 | Behymer | 24/586.11 |
| 5,405,809 A * | 4/1995 | Nakamura et al. | 438/64 |
| 5,590,495 A * | 1/1997 | Bressler et al. | 52/173.3 |
| 5,876,084 A | 3/1999 | Smith et al. | |
| 5,968,287 A * | 10/1999 | Nath | 136/251 |
| 6,184,056 B1 | 2/2001 | Nakamura et al. | |
| 6,594,870 B1 | 7/2003 | Lambrecht et al. | |
| 6,978,578 B2 * | 12/2005 | Givoni | 52/173.3 |
| 7,601,270 B1 * | 10/2009 | Unger et al. | 216/22 |
| 2004/0028503 A1* | 2/2004 | Charles | 411/510 |
| 2005/0079009 A1* | 4/2005 | Benedetti | F16B 5/123 |
| | | | 403/329 |
| 2007/0157963 A1* | 7/2007 | Metten et al. | 136/251 |
| 2007/0215195 A1* | 9/2007 | Buller et al. | 136/243 |
| 2008/0264470 A1 | 10/2008 | Masuda et al. | |
| 2008/0302409 A1* | 12/2008 | Bressler et al. | 136/251 |
| 2009/0114270 A1* | 5/2009 | Stancel | 136/251 |
| 2009/0220794 A1* | 9/2009 | O'Neill et al. | 428/414 |
| 2011/0155214 A1* | 6/2011 | Lam | 136/246 |
| 2011/0265861 A1 | 11/2011 | Näbauer et al. | |
| 2012/0085394 A1* | 4/2012 | McPheeters et al. | 136/251 |

FOREIGN PATENT DOCUMENTS

| | | |
|---|---|---|
| JP | 10-121685 A | 5/1998 |
| JP | 11-330526 A | 11/1999 |
| JP | 2000-122439 A | 4/2000 |
| JP | 3079644 U | 8/2001 |
| JP | 2002-115372 A | 4/2002 |
| JP | 2005-281996 A | 10/2005 |
| JP | 2006-120959 A | 5/2006 |
| JP | 2006-148043 A | 6/2006 |
| JP | 4125338 B2 | 7/2008 |
| JP | 4339238 B2 | 10/2009 |
| JP | 2009-263977 A | 11/2009 |
| JP | 4531960 B2 | 8/2010 |
| KR | 20-1998-015750 U | 6/1998 |
| KR | 10-2007-0042070 A | 4/2007 |
| KR | 20-2009-0007346 U | 7/2009 |
| WO | WO 2009/108304 A1 | 9/2009 |
| WO | WO 2010/006735 A2 | 1/2010 |

* cited by examiner

FRAME SYSTEM FOR SOLAR CELL MODULE

CROSS-REFERENCE TO RELATED APPLICATION

This application claims priority to and the benefit of Korean Patent Application No. 10-2011-0015434 filed in the Korean Intellectual Property Office on Feb. 22, 2011, the entire contents of which are incorporated herein by reference.

BACKGROUND OF THE INVENTION (a) Field of the Invention

Embodiments of the invention relate to a frame system for installing a solar cell module on a structural element, such a roof or a wall of a building.

(b) Description of the Related Art

Photovoltaic power generation that converts optical energy to electrical energy using a photoelectric conversion effect has been widely used as a means for obtaining non-polluting energy. Due to improvements in a photoelectric conversion efficiency of a solar cell, a photovoltaic power generation system using a plurality of solar cell modules can be installed even in individual homes.

A solar cell module having a plurality of solar cells that generate electricity by using sunlight is generally installed at a roof or an outer wall of a building, or on the ground, and a frame system is used for installing the solar cell module.

SUMMARY OF THE INVENTION

An example embodiment of the invention provides a frame system for a solar cell module that fixes the solar cell module to an installation object, the frame system including: a first frame member including a first body that is configured to be fixed to a substrate of the solar cell module and a male coupling portion that is protruded from the first body; and a second frame member including a second body that is configured to be fixed to the installation object and a female coupling portion that is configured to be coupled to the male coupling portion, wherein in at least a portion of an outer surface of the male coupling portion, a protrusion including an inclined surface having an upper width smaller than a lower width and a separation prevention surface that is positioned at a lower end portion of the inclined surface is formed, and at an inside of the female coupling portion, a protrusion coupling portion that corresponds to the protrusion is formed.

The separation prevention surface may be perpendicular to a center-line of the male coupling portion. In this instance, an angle between the separation prevention surface and the inclined surface may be less than 90°, preferably 45° or less. A connection portion of the separation prevention surface and the inclined surface may be rounded.

The male coupling portion may include at least two protrusions. In this instance, and the at least two protrusions may include a lower portion and an upper portion each having a lower width and an upper width so that the lower width and the upper width of the lower protrusion adjacent to the first body may be formed larger than the lower width and the upper width, respectively, of the upper protrusion that is positioned at an upper portion of the lower protrusion.

Alternatively, a lower width of a lower protrusion may be formed equally to a lower width of an upper protrusion, and an upper width of a lower protrusion may be formed equally to an upper width of an upper protrusion.

The first frame member may be made of a metal material. In this instance, the metal material may include an aluminum alloy.

The solar cell module may include a light transmitting upper substrate and lower substrate, and the first frame member may be bonded to the light transmitting upper substrate by adhesives.

The solar cell module may further include a plurality of thin film solar cells that are positioned at an upper portion of the light transmitting lower substrate and a sealing layer that is positioned between the thin film solar cells and the light transmitting upper substrate.

The sealing layer may include polyvinyl butyral (PVB) or ethyl vinyl acetate (EVA).

The adhesives that bond the first frame member to the light transmitting upper substrate may include two-part silicon. In this instance, the two-part silicon may have bonding strength of 2,000 N/m or more.

At least two of the first frame member may be fixed to the light transmitting upper substrate, and the at least two first frame members may be each fixed at symmetrical positions based on a center of the light transmitting upper substrate.

The first frame member may be formed as a spot type in which one male coupling portion is provided in one first body or as a bar type in which at least two male coupling portions are provided in one first body.

The second body may be made of a metal material. In this instance, the second frame member may further include a third body of a flexible material. In this instance, the female coupling portion may be formed in the third body, and the third body may be coupled to the second body.

According to such characteristics, after fixing the first frame member using adhesives to a portion of an upper surface of a light transmitting upper substrate that is provided in a solar cell module and fixing a second frame member to an installation object such as a building outer wall, in a state in which positions of a male coupling portion of the first frame member and a female coupling portion of the second frame member are aligned, by pushing the solar cell module toward the second frame member, the male coupling portion is coupled to the female coupling portion.

Therefore, an operator can simply execute an installation operation of a solar cell module and workability is improved, compared with a case of installing a solar cell module by an operation that couples a screw using a driver.

Further, it is unnecessary to install a quadrangular frame in an entire circumferential edge area of the solar cell module and thus it is unnecessary to install a frame for installing a quadrangular frame in an installation object, for example, a building outer wall and thus a frame cost can be reduced.

DETAILED DESCRIPTION OF THE EMBODIMENTS

In the following detailed description, example embodiments of the invention have been shown and described by way of illustration. As those skilled in the art would realize, the described embodiments may be modified in various different ways, all without departing from the spirit or scope of the invention. Accordingly, the drawings and description are illustrative and not restrictive. Like reference numerals designate like elements throughout the specification.

In the drawings, the thickness of layers, films, panels, regions, etc., are exaggerated for clarity. When any part, such as a layer, film, region, or plate, is described as positioned on another part, it refers to the part being directly on the other part or above the other part with at least one intermediate part.

In contrast, when an element is referred to as being "directly on" another element, there are no intervening elements present. Further, when an element is referred to as being "entirely" formed on another element, the element may be formed on an entire surface (or a front surface) of the another element and may be not formed at some edges.

Hereinafter, example embodiments of the invention will be described with reference to the attached drawings.

Figure 1:
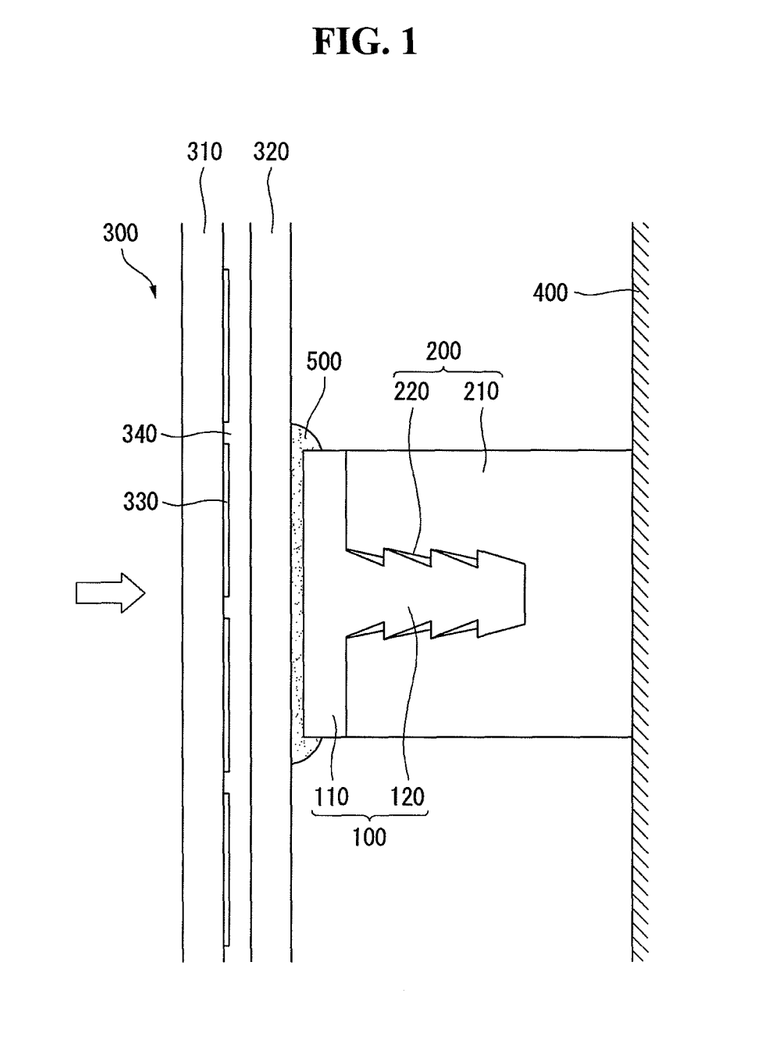
FIG. 1 is a cross-sectional view illustrating a frame system installing a solar cell module to a structural element according to a first example embodiment of the invention.
Figure 2:
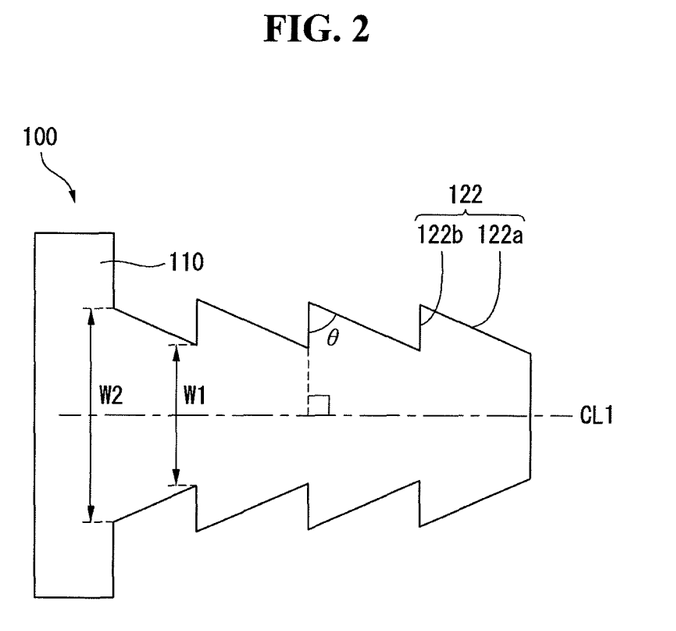
FIG. 2 is an enlarged cross-sectional view illustrating a first frame member of a frame system shown in FIG. 1 according to a first example embodiment of the invention.
Figure 3:
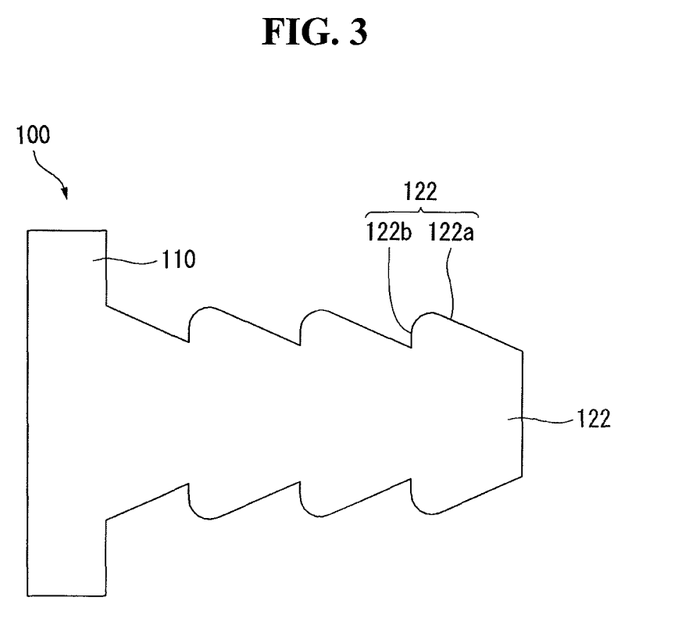
FIG. 3 is an enlarged cross-sectional view illustrating a modified example embodiment of a first frame member of a frame shown in FIG. 1 according to a first example embodiment of the invention.
Figure 4:
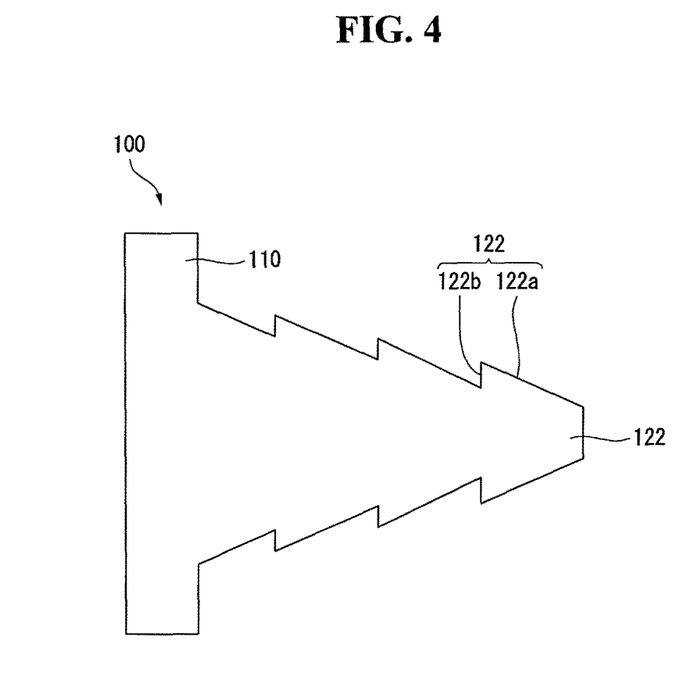
FIG. 4 is an enlarged cross-sectional view illustrating another modified example embodiment of a first frame member of a frame system shown in FIG. 1 according to a first example embodiment of the invention.
Figure 5:
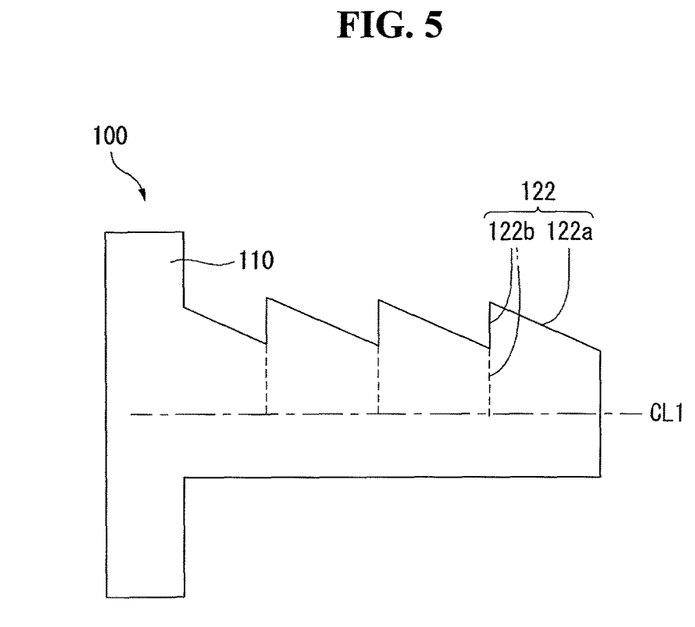
FIG. 5 is an enlarged cross-sectional view illustrating another modified example embodiment of a first frame member of a frame system shown in FIG. 1 according to an first example embodiment of the invention.
Figure 6:
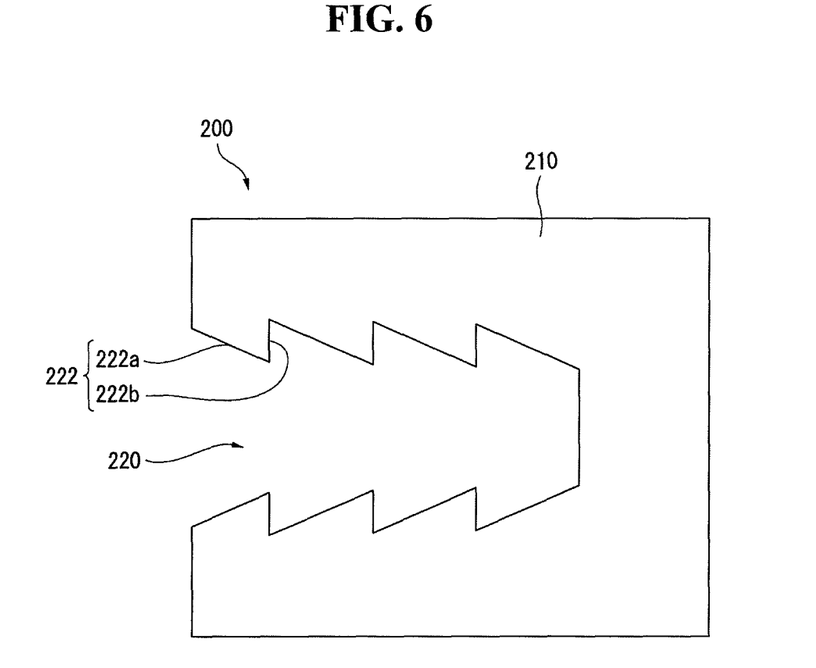
FIG. 6 is an enlarged cross-sectional view illustrating a second frame member of a frame system shown in FIG. 1 according to a first example embodiment of the invention.

FIG. 1 is a cross-sectional view illustrating a frame system installing a solar cell module to a structural element according to a first example embodiment of the invention. FIG. 2 is an enlarged cross-sectional view illustrating a first frame member of a frame system shown in FIG. 1 according to a first example embodiment of the invention, FIGS. 3 to 5 are enlarged cross-sectional views illustrating modified example embodiments of a first frame member of a frame system shown in FIG. 1 according to example embodiments of the invention, and FIG. 6 is an enlarged cross-sectional view illustrating a second frame member of a frame system shown in FIG. 1 according to a first example embodiment of the invention.

A frame system according to the example embodiment includes a first frame member 100 and a second frame member 200. The first frame member 100 is fixed to a solar cell module 300 and the second frame member 200 is fixed to a structural element (or an installation object), such as an outer wall 400 of a building, or vice versa, and the example embodiment includes a case where the solar cell module 300 is installed on a roof of a building or on the ground. In embodiments of the invention, the structural element also includes any element with a surface such as a pole, beam, a wall or the like.

The first frame member 100 is fixed to a substrate that is provided in the solar cell module 300. The solar cell module 300 includes a light transmitting lower substrate 310, a light transmitting upper substrate 320, a plurality of thin film solar cells 330 that are positioned between the substrates 310 and 320, and a sealing layer 340 that is positioned between the thin film solar cells 330 and the light transmitting upper substrate 320.

The light transmitting lower substrate 310 is made of glass or a polymer resin. In this instance, poly ethylene terephthlate (PET) may be used as the polymer resin.

A solar cell is formed as a thin film solar cell including a first electrode that is positioned on the light transmitting lower substrate 310, at least one photoelectric conversion portion that is positioned on the first electrode, and a second electrode that is positioned on the photoelectric conversion portion.

The first electrode of the thin film solar cell is formed as a conductive transparent electrode including a transparent conductive oxide (TCO). For example, the first electrode may be made of at least one material that is selected from tin oxide ($SnO_2$), zinc oxide (ZnO), and indium tin oxide (ITO). Further, the first electrode may be made of a mixed material in which at least one impurity is mixed with the material.

The photoelectric conversion portion may be one of a single junction type, a double junction type, or a triple junction type. A configuration of the photoelectric conversion portion that is provided in a thin film solar cell is well known, and thus, a detailed description thereof may be omitted.

The second electrode may be made of a conductive material, such as a single metal that is selected from gold (Au), silver (Ag), and aluminum (Al) and is connected in series to the first electrode of an adjacently disposed thin film solar cell.

The sealing layer 340 that is positioned on the solar cells 330 may be made of a material, for example, polyvinyl butyral (PVB) or ethyl vinyl acetate (EVA) that can combine the light transmitting lower substrate 310 and the light transmitting upper substrate 320.

An upper surface of the sealing layer 340 having such a configuration contacts with an entire lower surface of the light transmitting upper substrate 320, and a portion of the sealing layer 340 is filled in a space between the adjacent solar cells 330.

The light transmitting upper substrate 320 may be a transparent element, and can be made of glass, which is also the case with the light transmitting lower substrate 310. Further, a transparent polymer sheet, for example, polyethylene terephthalate (PET) that is bonded to at least one layer may be used as the light transmitting upper substrate 320.

When at least one of the light transmitting upper substrate 320 and the light transmitting lower substrate 310 is formed with a PET sheet, a solar cell module that includes the PET sheet is lighter and has a production cost that is cheaper.

In the thin film solar cell module 300 of such a configuration, a common quadrangular frame is not installed in a circumferential edge portion of the solar cell module. That is, the solar cell module 300 that is fixed to a building outer wall, etc., by a frame system according to the example embodiment may have a non-frame structure that does not use the quadrangular frame.

However, even if a quadrangular frame is installed in a circumferential edge portion of the thin film solar cell module 300, a frame system according to the example embodiment of the invention may be used.

The first frame member 100 that is fixed to an upper surface (or a first surface) of the light transmitting upper substrate 320 is made of a metal material, for example an aluminum alloy, and includes a first body 110 that is fixed to the upper surface of the light transmitting upper substrate 320 and a male coupling portion 120 that is protruded from the first body 110.

The bottom of the first body 110 is substantially flat, and adhesives 500 may be used to fix the bottom of the first body 110 to the upper surface of the light transmitting upper substrate 320. In embodiments of the invention, the adhesives 500 may include a silicon material, such as two-part silicon. In this instance, in order to sustain a fixing state of the first body 110, it is preferable, but not required, that the two-part silicon has bonding strength of 2,000 N/m or more. Accordingly, the first body 110, and therefore, the first frame member 100, is attachable to any portion of the upper surface of the light transmitting upper substrate 320.

At an outer surface of the male coupling portion 120 that is protruded from an upper portion of the first body 110, a saw-tooth shape protrusion 122 including an inclined surface 122a having an upper width W1 smaller than a lower width W2, and a separation prevention surface 122b that is positioned at a lower end portion of the inclined surface 122a is formed.

In the embodiment of the invention, the separation prevention surface 122b is formed perpendicular to a center-line CL1 of the male coupling portion 120. In this instance, an angle θ between the separation prevention surface 122b and the inclined surface 122a is less than 90°, preferably 45° or less. In other embodiments of the invention, the separation prevention surface 122b may be formed non-perpendicular to a center-line CL1 of the male coupling portion 120. A connected portion of the inclined surface 122a and the separation prevention surface 122b is sharply formed in the embodiment of the invention shown in FIG. 2.

In order to easily couple the male coupling portion 120 to a female coupling portion 220 of the second frame member 200, a connection portion of the inclined surface 122a and the separation prevention surface 122b may be rounded in a predetermined curvature R in the embodiment shown in FIG. 3.

As shown in FIG. 2, the male coupling portion 120 may include at least two saw-tooth shape protrusions 122. In this instance, each protrusion 122 may have the same upper width W1 and lower width W2.

Alternatively, as shown in FIG. 4, a lower width and an upper width of a lower protrusion adjacent to the first body 110 may be formed larger than a lower width and an upper width, respectively, of an upper protrusion that is positioned farther from the first body than the lower protrusion. According to such a configuration, the male coupling portion 120 as a whole approximates a shape of an isosceles triangle.

The foregoing example embodiment illustrates that the male type protrusion 122 is formed over an entire outer surface of the male coupling portion 120, but such is not required, and in other embodiments of the invention, the male type protrusion 122 may be formed only in some area of an outer surface of the male type protrusion 122, for example, an area corresponding to ½ of an entire area of an outer surface, as shown in FIG. 5.

That is, as shown in FIG. 5, the male type protrusion 122 may be formed only at an outer surface of an upper part of the male coupling portion 120 based on a center CL1. Alternatively, the male type protrusion 122 may be formed only at an outer surface of a lower part of the male coupling portion 120.

The male type protrusion 122 may be formed only in an area corresponding to ⅔ or ¾ of an outer surface of the male coupling portion 120, and a forming area of the male type protrusion 122 may be variously changed. Thus, in embodiments of the invention, the area having the male type protrusion 122 may be set in a range between ½ to ¾ of the outer surface of the male type protrusion 122. In other embodiments of the invention, the area may even be less than ½.

The second frame member 200 may be fixed to a building outer wall, for example, and as a fixing means of the second frame member 200, adhesives 500 or a fixing screw may be used. In embodiments of the invention, the second frame member 200 need not be attached on a surface to the structural element, such as the building outer wall, and thus, may be embedded or inserted, either wholly or partly, to the building outer wall.

In the example embodiment, the second frame member 200 includes a second body 210 of a flexible material, and the female coupling portion 220 for coupling the male coupling portion 120 formed in the second body 210.

The female coupling portion 220 has the same shape as or a shape similar to a sectional shape of the male coupling portion 120. That is, as shown in FIG. 6, a protrusion coupling portion 222 for coupling with the protrusion 122 is provided at the inside of the female coupling portion 220, and the protrusion coupling portion 222 includes an inclined surface 222a corresponding to the inclined surface 122a of the protrusion 122 and a separation prevention surface 222b corresponding to the separation prevention surface 122b of the protrusion 122.

When the male coupling portion 120 has a structure that is shown in FIGS. 3 to 5, the female coupling portion 220 may be formed in a shape corresponding to the male coupling portion 120. The shape of the female coupling portion 220 need not coincide exactly with the shape of the male coupling portion 120.

Figure 8:
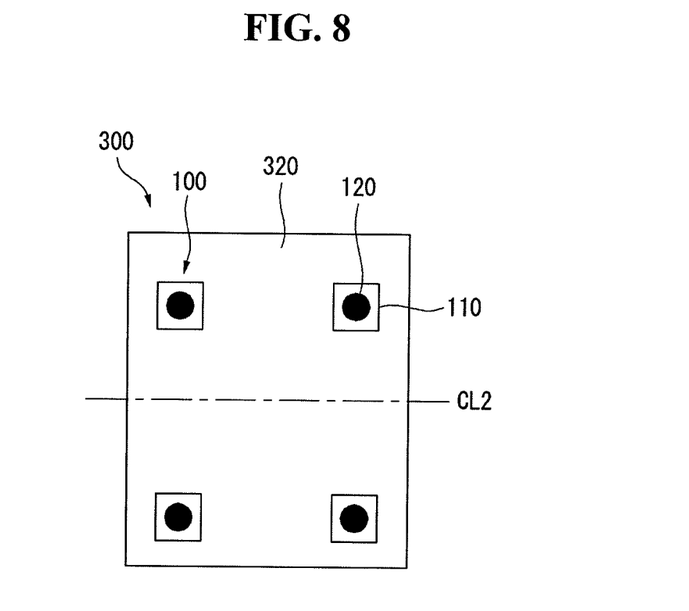
FIG. 8 is a top plan view of an upper substrate having a first frame member fixed thereto according to a first example embodiment of the invention.
Figure 9:
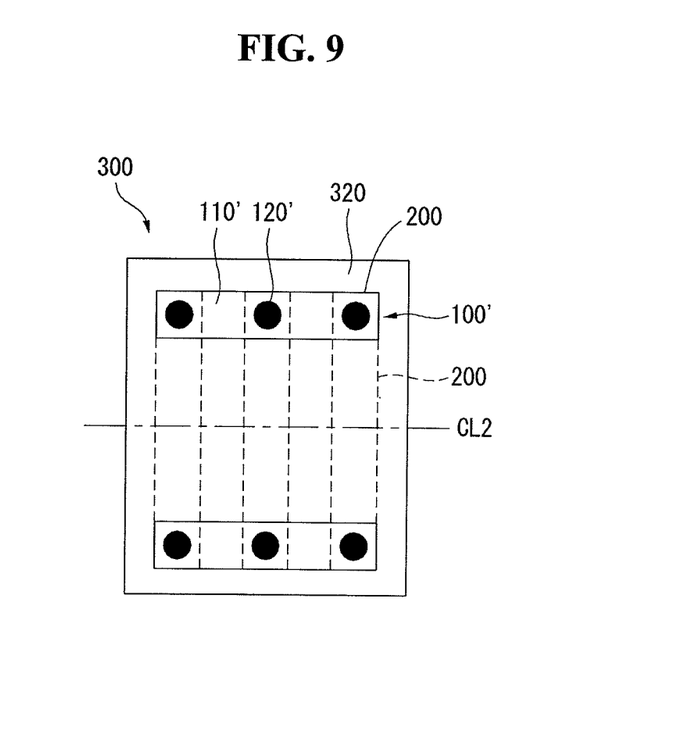
FIG. 9 is a top plan view of an upper substrate having a first frame member fixed thereto according to a second example embodiment of the invention.

The first frame member 100 of such a structure may be formed in a spot type, as shown in FIG. 8, and may be formed in a bar type, as shown in FIG. 9. In this instance, a spot type first frame member 100 has one male coupling portion 120 being provided in one first body 110, and a bar type first frame member 100' has at least two male coupling portions 120' being provided in one first body 110'.

As shown in FIGS. 8 and 9, the spot type first frame member 100 or the bar type first frame member 100' may be each fixed to a symmetrical position based on a center CL2 of the light transmitting upper substrate 320 of the solar cell module 300.

FIG. 8 illustrates a state in which four spot type first frame members 100 are fixed to an upper surface of the light transmitting upper substrate 320, and FIG. 9 illustrates a state in which two bar type first frame members 100' are fixed to an upper surface of the upper substrate 320.

As described above, adhesives 500 for fixing the first frame members 100 or 100' to the upper surface of the upper substrate 320 may be made of the two-part silicon having bonding strength of 2,000 N/m or more.

Therefore, when a weight of the solar cell module 300 is approximately 20 kg, it is preferable that at least four spot type first frame members 100 are used and at least two bar type first frame members 100' are used. The number and a fixing position of the first frame member 100 or 100' may be changed in various forms.

The second frame member 200 may be formed in a spot type or a bar type, and may be coupled to the first frame member 100 according to various combination methods. In this instance, the spot type second frame member 200 has one female coupling portion 220 being provided in one second body 210, and the bar type second frame member 200 has at least two female coupling portions 220 being provided in one second body 210.

Therefore, as shown in FIG. 8, when the spot type first frame member 100 is used, the second frame member 200 used may be a spot type or a bar type. When the bar type second frame member 200 is used, the frame member 200 may be installed in a horizontal direction or in a vertical direction at a structural element, such as a building outer wall (i.e., an outer wall of a building).

Similarly, as shown in FIG. 9, even when the bar type first frame member 100' is used, the spot type or bar type second frame member 200 may be used.

When the bar type second frame member 200 is used, the frame member 200 may be installed in a horizontal direction at a building outer wall as indicated by a solid line, or may be installed in a vertical direction at a building outer wall, as indicated by a dotted line.

Figure 10:
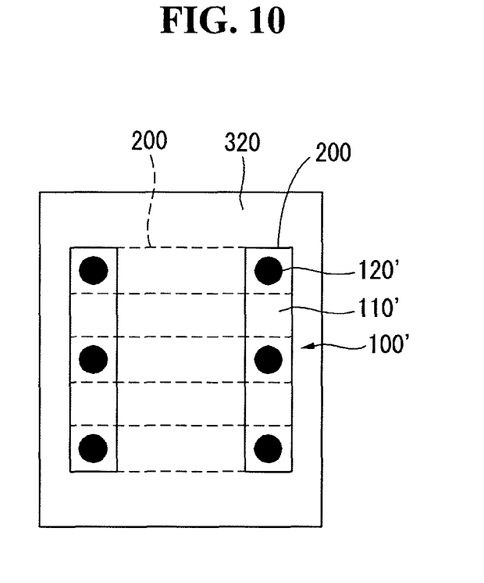
FIG. 10 is a top plan view illustrating an upper substrate according to a modified example embodiment of FIG. 9.

Alternatively, as shown in FIG. 10, the bar type first frame member 100' may be fixed in a vertical direction to an upper surface of the upper substrate 320, and even in this instance, the spot type or bar type second frame member 200 may be used. When the bar type second frame member 200 is used, the frame member 200 may be installed in a vertical direction at a building outer wall as indicated by a solid line, or may be installed in a horizontal direction at a building outer wall, as indicated by a dotted line.

Also, the spot type and the bar type first frame members may be used together. That is, when the bar type first frame member 100 and the bar type second frame member 200 are used together, the second frame member 200 may be installed parallel to the first frame member 100 or may be installed to intersect the first frame member 100.

Figure 11:
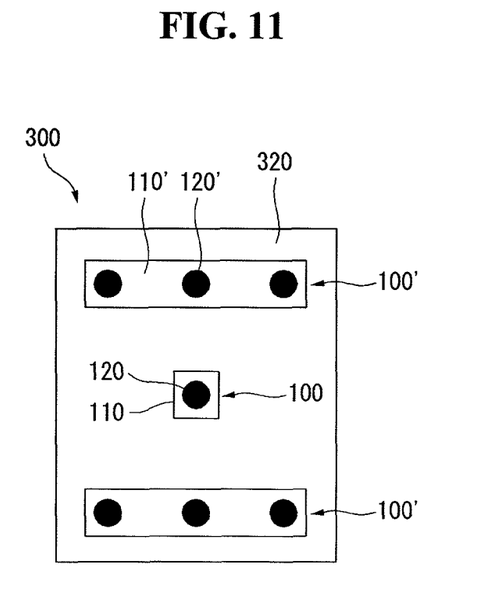
FIG. 11 is a top plan view of an upper substrate having the first frame member of FIGS. 8 and 9 fixed thereto according to an example embodiment of the invention.

As shown in FIG. 11, the spot type first frame member 100 and the bar type first frame member 100' may be used together. In this instance, one spot type first frame member 100 may be fixed between two bar type first frame members 100'. In another instance, one bar type first frame member 110' may be fixed between two spot type first frame members 100. According to the above-described method, the second frame member 200 may be installed with various methods.

As shown in FIGS. 8 to 11, after fixing the first frame member 100 or 100' to an upper surface of the upper substrate 320 and the second frame member 200 to an installation object such as the building outer wall 400, when positions of the male coupling portion 120 of the first frame member 100 and the female coupling portion 220 of the second frame member 200 are aligned, by pushing the solar cell module 100 toward the building outer wall 400 in an arrow direction that is shown in FIG. 1, the male coupling portion 120 becomes coupled to the female coupling portion 220.

Therefore, an operator can simply execute an installation operation of a solar cell module 300 and workability is improved, compared with a case of installing a solar cell module by an installation operation that couples a screw using a driver.

Further, it is unnecessary to install a quadrangular frame around an entire circumferential edge area of the solar cell module 300, and thus, it is unnecessary to install a frame for installing the quadrangular frame in an installation object, for example, a building outer wall, and thus, a frame cost can be reduced.

Hereinafter, a frame system according to a second example embodiment of the invention will be described with reference to FIG. 7.

Figure 7:
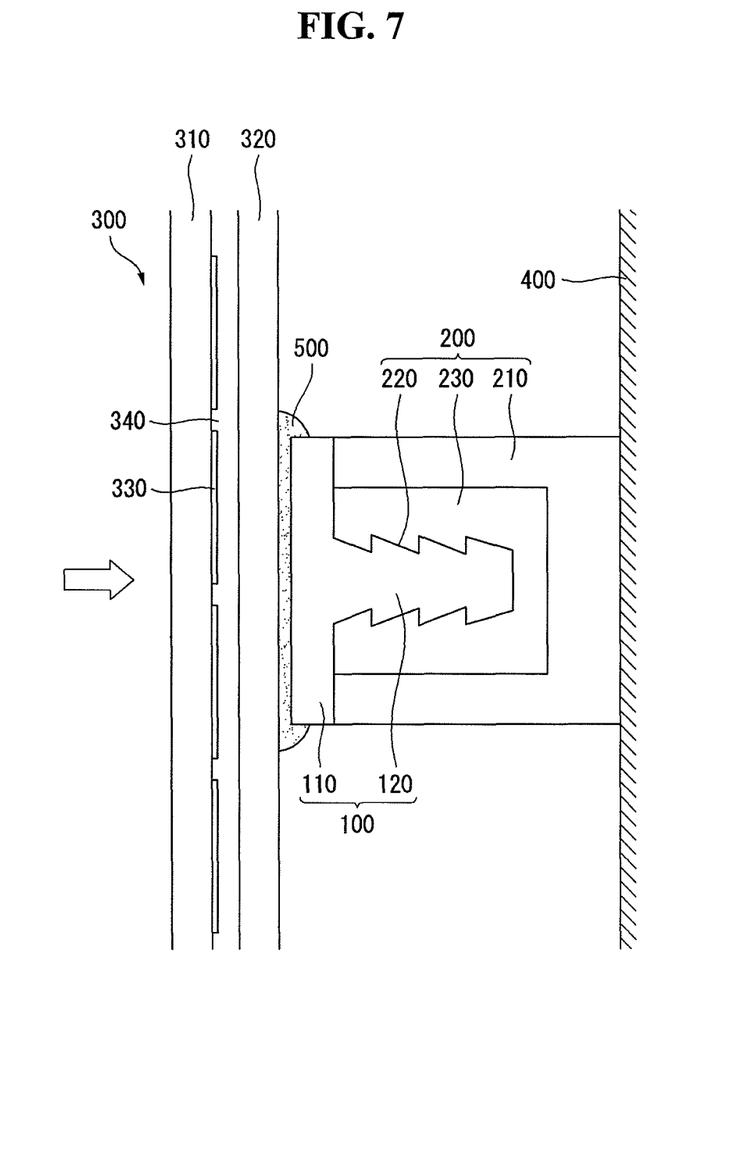
FIG. 7 is a cross-sectional view illustrating a frame system installing a solar cell module to a structural element according to a second example embodiment of the invention.

FIG. 7 is a cross-sectional view illustrating a frame system installing a solar cell module to a structural element according to a second example embodiment of the invention.

In the frame system of the example embodiment, because the first frame member 100 has the same configuration as that of the foregoing example embodiment, and hereinafter, only the second frame member 200 will be described, and constituent elements identical to or corresponding to those of the foregoing example embodiment are denoted by the same reference numerals.

The second body 210 of the second frame member 200 is made of a firm or a rigid material, such as a metal material, for example, aluminum alloy. Therefore, when the female coupling portion is formed in the second body 210, an inclined surface that is provided in the protrusion coupling portion of the female coupling portion is not deformed and thus it may be difficult to couple the male coupling portion 110 to the female coupling portion. Therefore, the second frame member 200 of the example embodiment further includes a third body 230 of a flexible material.

The female coupling portion 220 is formed in the third body 230 of a flexible material, and the third body 230 is fixed to the second body 210. According to such a structure, because the protrusion coupling portion 222 of the female coupling portion 220 is made of a flexible material, in order to couple the male coupling portion 120 to the female coupling portion 220 such as shown in FIG. 6, when pushing the solar cell module 300 in an arrow direction that is shown in FIG. 1, the inclined surface 222a of the protrusion coupling portion 220 is deformed by the inclined surface 122a of the protrusion 120. Therefore, the male coupling portion 120 can be easily coupled to the female coupling portion 220.

Although shown with a male coupling portion 120 having a saw-tooth shape protrusion 122 that correspond to a female coupling portion 220 having a protrusion coupling portion 222, in other embodiments of the invention, the protrusions 122 and protrusion coupling portion 222 may have other shapes, such as a squire wave, a sinusoidal wave, a hemispheric protrusions and/or indentations, or others.

By forming a cutout portion in the second body 210 instead of using the third body 230, when the male coupling portion 120 is coupled to the female coupling portion 220, the male coupling portion 120 may be coupled to the female coupling portion 220 by a method of somewhat separating the second body 210 from the cutout portion.

What is claimed is:

1. A frame system for a solar cell module, the frame system comprising:
    the solar cell module comprising a first glass substrate, a second glass substrate facing the first glass substrate, a plurality of solar cells positioned between the first glass substrate and the second glass substrate, and a sealing layer configured to seal the plurality of solar cells between the first glass substrate and the second glass substrate; a first frame member fixed to the solar cell module and formed of a metal material, the first frame member comprising a first body fixed to the second glass substrate by an adhesive and a male coupling portion that is cylindrical and protruded from the first body, the male coupling portion having a saw-toothed outer surface with a plurality of first inclined surfaces having a downhill slope from the solar cell module to an installation object and a plurality of first separation prevention surfaces that are positioned at a lower end portion of the plurality of first inclined surfaces; and a second frame member fixed to the installation object and comprising a second body of a metal material having a closed hole, a third body of a flexible material mounted in the closed hole and a female coupling portion formed along an outer circumferential surface of the third body, the female coupling portion having a groove including a saw-toothed inner surface with a plurality of second inclined surfaces corresponding to the plurality of first inclined surface surfaces and a plurality of second separation prevention surfaces corresponding to the first separation prevention surfaces that are positioned at a lower end portion of the plurality of second inclined surfaces, and the second body surrounding an entire outer side and bottom surfaces of the third body, such that the entire outer side and bottom surfaces of the third body directly contact an inner surface of the second body, wherein the second body rigidly supports the third body so that the third body is confined in the closed hole, wherein the first frame member is installed at the second frame member by inserting the male coupling portion to the female coupling portion, so that the first body of the first member directly contacts both the second body and the third body of the second from member and wherein the solar cell module lacks a quadrangular frame in an entire circumferential edge area of the solar cell module.

2. The frame system of claim 1, wherein the plurality of first separation prevention surfaces are perpendicular to a center-line of the male coupling portion.

3. The frame system of claim 2, wherein an angle between the plurality of first separation prevention surfaces and the plurality of first inclined surfaces is less than 90°.

4. The frame system of claim 2, wherein an angle between the plurality of first separation prevention surfaces and the plurality of first inclined surfaces is 45° or less.

5. The frame system of claim 2, wherein a connection portion of the plurality of first separation prevention surfaces and the plurality of first inclined surfaces is rounded.

6. The frame system of claim 1, wherein the male coupling portion includes a lower protrusion and an upper protrusion each having a lower width and an upper width, and wherein the lower width and the upper width of the lower protrusion are formed larger than the lower width and the upper width of the upper protrusion, respectively.

7. The frame system of claim 1, wherein the metal material of the first frame member comprises an aluminum alloy.

8. The frame system of claim 1, wherein the sealing layer comprises polyvinyl butyral (PVB) or ethyl vinyl acetate (EVA).

9. The frame system of claim 1, wherein the adhesive comprises two-part silicon.

10. The frame system of claim 9, wherein the two-part silicon has bonding strength of 2,000 N/m or more.

11. The frame system of claim 1, wherein the first frame member is plural, and at least two first frame members are fixed to the second glass substrate.

12. The frame system of claim 11, wherein the at least two first frame members are each fixed at symmetrical positions based on a center of the second glass substrate.

13. The frame system of claim 1, further comprising another frame member that is formed as a spot type in which one male coupling portion is provided in one first body.

14. The frame system of claim 1, wherein the first body has a bar shape, at least two male coupling portions are individually protruded from the first body, and at least two first bodies are provided on the second glass substrate.

* * * * *